US008679387B2

(12) United States Patent
Yoshioka et al.

(10) Patent No.: US 8,679,387 B2
(45) Date of Patent: Mar. 25, 2014

(54) METHOD AND APPARATUS FOR COMPRESSING PARTICULATE MATTER

(75) Inventors: Hisao Yoshioka, Tokyo (JP); Sigeyasu Ito, Tokyo (JP)

(73) Assignee: Sanwa System Engineering Co., Ltd., Tokyo (JP)

( * ) Notice: Subject to any disclaimer, the term of this patent is extended or adjusted under 35 U.S.C. 154(b) by 94 days.

(21) Appl. No.: 13/382,061

(22) PCT Filed: Jun. 23, 2010

(86) PCT No.: PCT/JP2010/060618
§ 371 (c)(1),
(2), (4) Date: Mar. 13, 2012

(87) PCT Pub. No.: WO2011/001868
PCT Pub. Date: Jan. 6, 2011

(65) Prior Publication Data

US 2012/0161354 A1 Jun. 28, 2012

(30) Foreign Application Priority Data

Jul. 3, 2009 (JP) ................................ 2009-158765

(51) Int. Cl.
*B29C 43/02* (2006.01)
*B29C 43/54* (2006.01)

(52) U.S. Cl.
USPC ................ 264/120; 425/78; 425/352; 419/66

(58) Field of Classification Search
None
See application file for complete search history.

(56) References Cited

U.S. PATENT DOCUMENTS

| | | | | |
|---|---|---|---|---|
| 3,613,166 | A | 10/1971 | Wallace et al. | |
| 6,241,935 | B1 * | 6/2001 | Beane et al. | 264/437 |
| 6,325,965 | B1 | 12/2001 | Makita et al. | |
| 7,368,075 | B2 * | 5/2008 | Olsson | 264/109 |
| 2001/0018029 | A1 * | 8/2001 | Ogawa et al. | 419/66 |
| 2005/0220921 | A1 * | 10/2005 | Olsson | 425/352 |
| 2010/0092328 | A1 * | 4/2010 | Thomas et al. | 419/28 |

FOREIGN PATENT DOCUMENTS

| | | |
|---|---|---|
| JP | 9 57496 | 3/1997 |
| JP | 2000 197996 | 7/2000 |
| JP | 2004 174595 | 6/2004 |
| JP | 2004 174596 | 6/2004 |

OTHER PUBLICATIONS

Magnetostrictive Actuators, New Linear Magnetic Actuators Version 1.1, pp. 14-15, Jan. 2007, available at www.cedrat.com.*
Claeyssen, F. et al, Magnetostrictive Actuators Compared to Piezo-electric Actuators, 2002, available at www.cedrat.com.*
Machine translation of JP 2004-174596.*
International Search Report Issued Jul. 20, 2010 in PCT/JP10/60618 Filed Jun. 23, 2010.

* cited by examiner

*Primary Examiner* — Mary F Theisen
(74) *Attorney, Agent, or Firm* — Oblon, Spivak, McClelland, Maier & Neustadt, L.L.P.

(57) ABSTRACT

A compression molding apparatus for particulate matter comprising a magnetostrictive actuator functioning as an impact force applying means arranged at least between an upper ram or a lower ram and an upper punch or a lower punch. Particulate matter is compressed by a static pressure, and then an impact force is applied to the particulate matter to reduce internal stress. After compressing the particulate matter by the static pressure, the upper ram is allowed to fall gravitationally to shorten a molding time.

10 Claims, 9 Drawing Sheets

(a)

(b)

METHOD AND APPARATUS FOR COMPRESSING PARTICULATE MATTER

TECHNICAL FIELD

This invention relates to a method for carrying out a compression molding of granulated particles of ceramic, metal etc. using an upright pressing apparatus.

BACKGROUND ART

Particulate material is prepared by mixing binder such as wax into particles of ceramic or metal. The particulate material thus prepared is compressed in a mold of a pressing machine, and then sintered in a furnace to be used as a carbide tip, a precision machinery component and so on.

According to a conventional method for compressing the particulate material using a conventional pressing machine, an upper punch and a lower punch of the pressing machine are reciprocated slowly by a crank mechanism or a hydraulic mechanism. In addition, friction between the particulate materials is rather high. Therefore, the particulate material cannot be compressed densely by a conventional pressing machine, and density distribution of the particulate materials thus compressed by the conventional pressing machine is not sufficiently homogeneous.

One example of a conventional powder pressing machine is disclosed in Japanese Patent Laid-Open No. 2004-174596. According to the teachings of Japanese Patent Laid-Open No. 2004-174596, a punch is attached individually to an upper and lower rams through a lamination type piezoelectric element, and powder filled in a metal mold is compressed smoothly into a desired shape by applying impact force intermittently. Therefore, the powder pressing machine taught by Japanese Patent Laid-Open No. 2004-174596 is capable of resolving the above-explained disadvantages.

The impact-type powder pressing machine taught by Japanese Patent Laid-Open No. 2004-174596 is shown in FIG. 11. As shown in FIG. 11, the powder pressing machine taught by Japanese Patent Laid-Open No. 2004-174596 comprises: a frame 1; an intermediate frame 11; an upper ram 2; a ball screw 21 for reciprocating the upper ram 2; a lamination type piezoelectric element 23; an upper punch 3 attached to the upper ram 2 through the piezoelectric element 23; a die 4 fixed to the intermediate frame 11; a lower ram 5; a ball screw 51 for reciprocating the lower ram 5; a lamination type piezoelectric element 52; and a lower punch 6.

For example, a Piezo-Electric Transducer (abbreviated as PZT) is known as the piezoelectric element in the prior art. Specifically, PZT is a ceramic element which is deformed instantaneously by applying driving voltage thereto.

However, as explained in paragraph [0030] of Japanese Patent Laid-Open No. 2004-174596, a range of deformation of the piezoelectric element is not very wide e.g., within several μm and several 10 μm. Therefore, according to the powder pressing machine taught by Japanese Patent Laid-Open No. 2004-174596, a plurality of piezoelectric elements have to be laminated to form the lamination type piezoelectric element. Further, the lamination type piezoelectric element cannot function effectively if a spring back amount of the powder material (i.e., a difference between thicknesses thereof when compressed and after compressed) is larger than a deformation amount thereof.

Basically, the impact force is not oriented to the specific direction. Therefore, the powder pressing machine taught by Japanese Patent Laid-Open No. 2004-174596 has to be improved to concentrate the impact force to vertical direction.

In addition to the above-explained disadvantages, the inventors of the present invention have found a fact that the impact force cannot be transmitted effectively in the powder material and voids would remain in the powder material, without applying predetermined pressure to the powder material in advance of applying the impact force thereto. Therefore, according to the teachings of Japanese Patent Laid-Open No. 2004-174596, the impact force cannot propagate entirely into the powder material to compress the powder material homogeneously.

DISCLOSURE OF THE INVENTION

The present invention has been conceived noting the technical problems thus far described, and its object is to compress particulate matter homogeneously without remaining voids therein by applying an impact force effectively to the particulate material.

In order to achieve the above-mentioned object, according to the present invention, there is provided a compression molding method for particulate matter filled in a cavity of a die by an upper punch arranged above the die, or by a lower punch arranged underneath the die, characterized by comprising: compressing the particulate matter filled in the cavity of the die to a predetermined pressure by moving the upper punch downwardly or moving the lower punch upwardly; and thereafter further compressing the particulate matter by applying an impact force thereto by actuating an impact force applying means arranged between the upper punch and an upper ram to which the upper punch is attached, or arranged between the lower punch and a lower ram to which the lower punch is attached.

According to the method of the present invention, a clearance gap created between the particulate matter further compressed by the impact force applying means and the upper or lower punch is eliminated by moving the upper punch downwardly again or by moving the lower punch upwardly again.

Specifically, according to the method of the present invention, said compression of the particulate matter to the predetermined pressure by moving the upper punch downwardly or moving the lower punch upwardly is carried out by applying a weight of the upper punch falling gravitationally within a clearance created between a reciprocating mechanism of the upper punch and the upper ram.

According to the method of the present invention, the compression of the particulate matter to the predetermined pressure by moving the upper punch downwardly or moving the lower punch upwardly, and the further compression of the particulate matter by the impact force applying means, are carried out repeatedly.

Specifically, the impact force applying means includes a magnetostrictive actuator.

In addition, a stroke of the impact force applying means to further compress the particulate matter is more than twice as an average grain diameter of the particulate matter.

According to another aspect of the present invention, there is provided an upright compression molding apparatus for particulate matter, which is adapted to compress particulate matter filled in a cavity of a die by moving an upper punch arranged above the die downwardly, or by moving a lower punch arranged underneath the die upwardly, characterized by comprising: a magnetostrictive actuator functioning as an impact force applying means, which is interposed at least between the upper punch and an upper ram to which the upper punch is attached, or between the lower punch and a lower ram to which the lower punch is attached.

The compression molding apparatus further comprises: a reciprocating mechanism, which is adapted to reciprocate the upper punch. According to the particulate matter compressing apparatus of the present invention, the reciprocating mechanism is engaged with the upper ram while keeping a predetermined clearance thereby allowing the upper punch to fall gravitationally in a vertical direction, and a weight of an assembly including the upper punch and the upper ram is applied to the particulate matter to compress the particulate matter to the predetermined pressure.

According to the present invention, an internal stress of the particulate matter is reduced by thus applying the impact force to the particulate matter when compressing the particulate matter. Therefore, the compressed particulate matter can be shrunk homogeneously at a subsequent sintering step so that a quality of final product can be improved.

BEST MODE FOR CARRYING OUT THE INVENTION

First of all, a compression molding method of the present invention will be explained with reference to FIG. 3.

Figure 3:
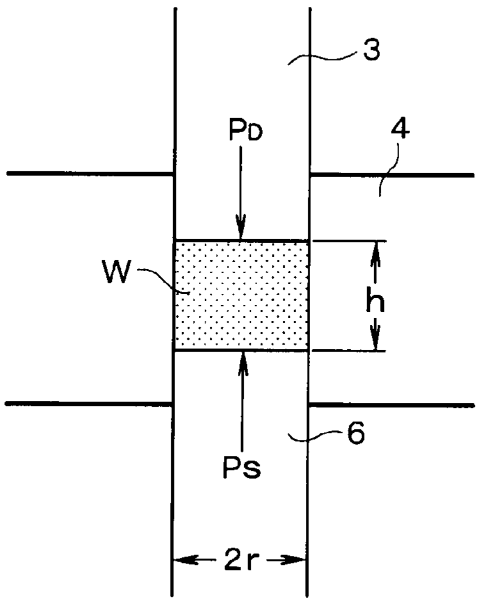
FIG. 3 is an explanation drawing explaining a compression molding method according to the present invention.
Figure 4:
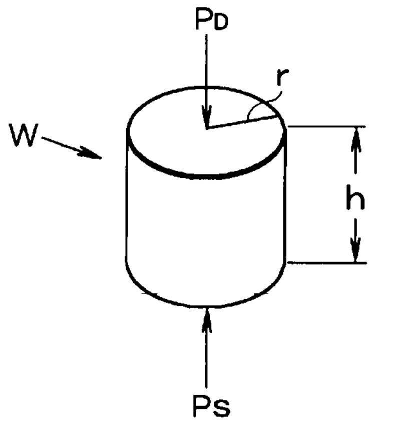
FIG. 4 is a perspective view showing a work to be compressed by the compression molding method illustrated in FIG. 3.

In the example shown in FIG. 3, an upper punch 3 and a lower punch 6 are individually shaped into a cylindrical shape, and each radius r of those upper and lower punches 3 and 6 is approximately 2 mm. Meanwhile, a cylindrical cavity to which the upper and lower punches 3 and 6 are inserted is formed in a die 4, and a radius of the cavity is also approximately 2 mm. As shown in FIG. 4, particulate matter is filled in the cylindrical cavity of the die 4 to be compressed as a work W. In case of compressing the work W by lowering the upper punch 3 while fixing the lower punch 6, a reaction force $P_S$ as a static load of the fixed lower punch 6 can be obtained by the following formula:

$$P_S = P_D - (2\pi rh \cdot \text{friction coefficient} \cdot \text{internal stress}) \quad (1)$$

where $P_D$ represents compressive load of the upper punch 3. That is, a friction resistance can be calculated by the formula in the bracket.

In order to eject the compressed work W from the cavity of the die 4 by moving the lower punch 6 upwardly, the lower punch 6 is required to push the work W by a pushing force $P_E$ larger than the friction resistance. The required pushing force $P_E$ can be obtained by the following formula:

$$P_E = 2\pi rh \cdot \text{friction coefficient} \cdot \text{internal stress} \quad (2).$$

The internal stress in the above-formula (2) can be calculated by measuring the pushing force $P_E$, and substituting the measured pushing force $P_E$ into the formula (2). The internal stress thus calculated can be used as an index for estimating homogeneity of density in the compressed particulate matter.

Figure 5:
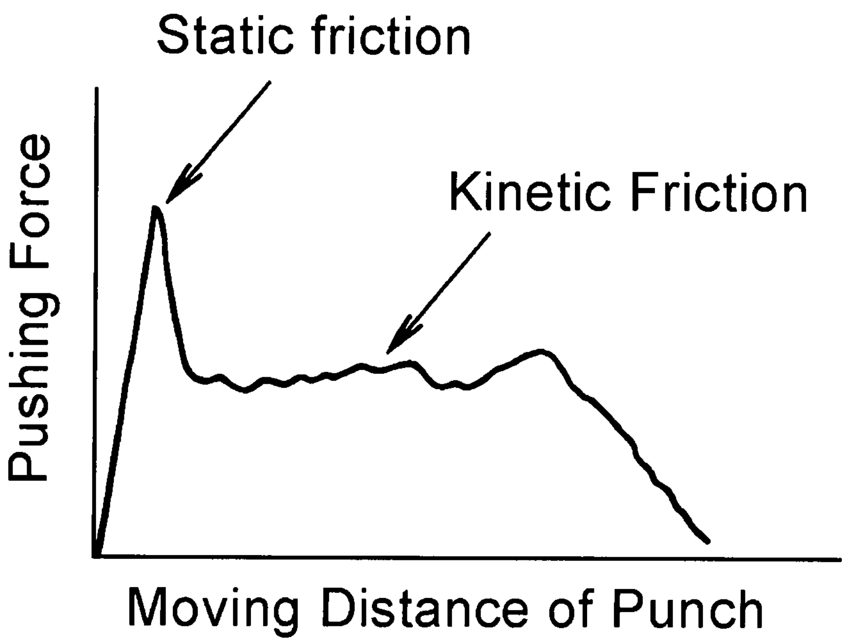
FIG. 5 is a graph showing a relation between a moving distance of the punch and a pushing force.

FIG. 5 is a graph showing one example of a relation between a moving distance of the lower punch 6 and the pushing force for pushing the work W. As indicated in FIG. 5, the pushing force is increased steeply and proportionally in the beginning of a movement of the lower punch 6, that is, static friction acts between the work W and the cavity in this range. Then, the static friction turns into kinetic friction and the pushing force becomes smaller to a value about half of the pushing force in the range where the static friction is acting.

Figure 6:
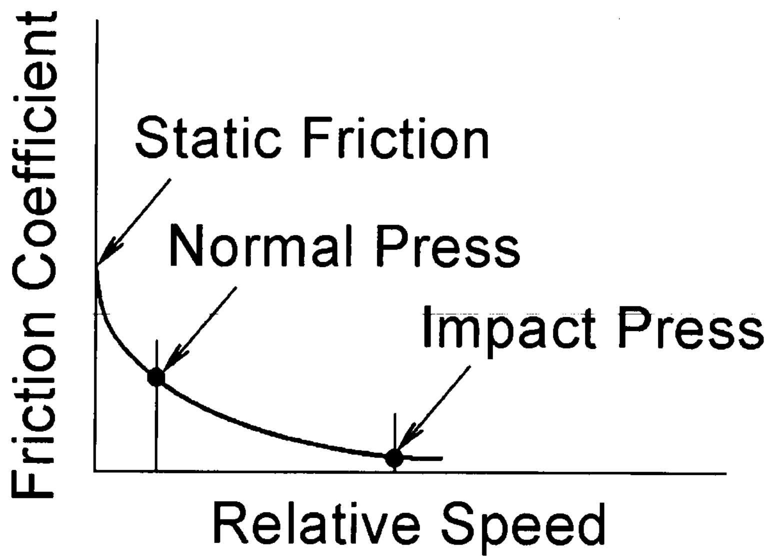
FIG. 6 is a graph showing a relation between a relative speed of the punch and a friction coefficient.

A relation between coefficient of friction and relative speed of the punch changes exponentially as shown in FIG. 6. However, such relation is expressed as a diagonal line inclining downwardly toward right side in a single logarithmic plot. In FIG. 6, coefficient of static friction is indicated at an intersection between a vertical axis and a curved line, that is, at a point where the relative speed of the punch is zero. Meanwhile, coefficient of kinetic friction is indicated in a range where the speed of the punch is increasing. According to a normal pressing machine, a speed of the punch is approximately within a range from 10 to 100 mm per second. On the other hand, a speed of the punch becomes almost 1 meter per second in case of the impact pressing. That is, the friction coefficient under the impact pressing is much smaller than that under a normal pressing.

The friction coefficient is varied according to the kind of particulate matter. However, the inventors of the present application have experimentally found a fact that the friction coefficient of the individual particulate matter will not be changed before and after compressing.

Figure 7:
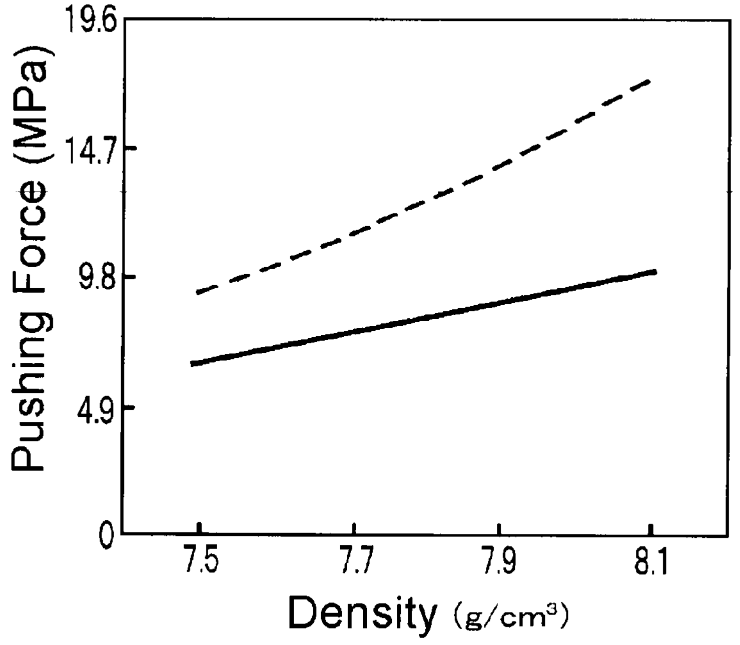
FIG. 7 is a graph showing a relation between a density and a pushing force.
Figure 7:
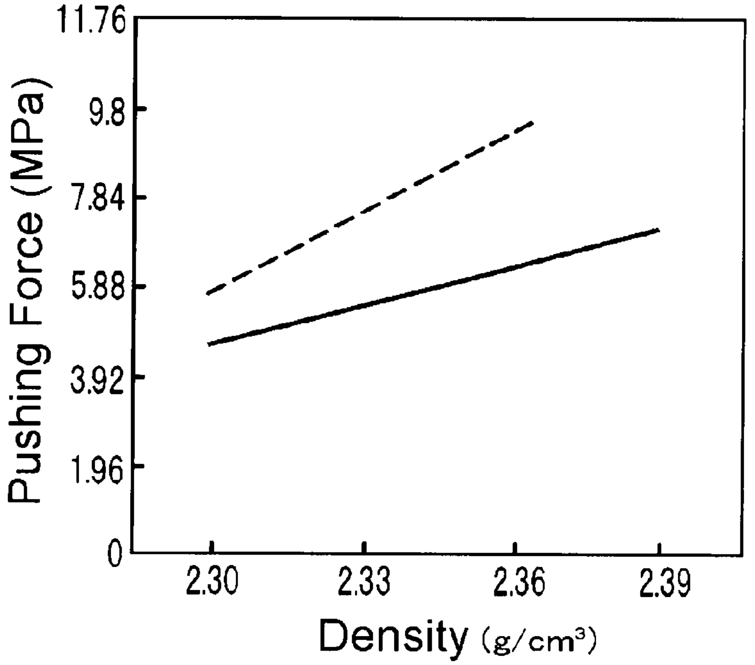

FIG. 7 is a graph indicating a relation between a pushing force for pushing the work W and a density of the work W. In an example shown in FIG. 7(*a*), agglomerated particles of tungsten carbide (WC) are used to form the work W. Meanwhile, alumina particles are used to form the work W in an example shown in FIG. 7(*b*).

Here, a grain diameter of tungsten carbide particle is approximately 10 μm. Thus, the particles of tungsten carbide are too fine, and the particles of tungsten carbide are therefore difficult to be filled in the cavity as it is. In this example, therefore, the particles of tungsten carbide are agglomerated to form a particle of approximately 50 μm by being mixed with a binder.

In FIG. 7, a broken line represents the relation between a pushing force pushing the work W and a density of the work W under the normal compression molding, and a solid line represents said relation under the compression molding while applying an impact force. As can be seen from FIG. 7, the pushing forces of both cases increase in accordance with an increase in the density of the work W, and the pushing force of the case in which is the impact force is applied is reduced 25-45% in comparison with that of the case in which the impact force is not applied. Such a difference in the pushing forces of those cases is widened more significantly in accordance with an increase in the density of the work W.

However, the pushing force cannot be reduced effectively by merely applying the impact force to the work W when compressing. The inventors of the present invention have found a fact that it is preferable to compress the particulate matter to a predetermined pressure by a conventional procedure (that is, by applying a precompression force to the particulate matter), and then applying an impact force to the particulate matter. Otherwise, the impact force cannot be transmitted entirely in the particulate matter, that is, the impact force is applied only to a surface of the particulate matter. Specifically, a preferable range of the precompression force applied to the particulate matter in advance is 4.9 to 14.7 MPa (50 to 150 kg/cm$^2$) depending on a size of the mold and a kind of the particulate matter. If the precompression force applied to the particulate matter is smaller than the above-mentioned range, remaining porosity of the particulate matter thus compressed preliminary is still too large to compress the particulate matter effectively by applying the impact force subsequently. To the contrary, in case the precompression force applied to the particulate matter is larger than the above-mentioned range, voids in the particulate matter are crushed excessively and it is also unfavorable.

In case of compressing the particulate matter by applying the impact force thereto, a stroke of the punch is also an important factor. As described, an average grain diameter of the particles of ceramic or the like is approximately 50 μm. In this case, a length of the stroke is required to be at least twice as much as the grain diameter, that is, the length of the stroke has to be more than 100 μm. If the length of the stroke is shorter than 100 μm, it is difficult to apply the impact force to the particulate matter effectively, like a conventional method for compressing the particles by a static pressure. Therefore, longer stroke is preferable to compress the particulate matter.

For this purpose, a magnetostrictive device such as a magnetostrictive actuator is used as the impact force applying means. Specifically, the magnetostrictive actuator is a rod member whose length is approximately 50 mm, and a coil is wrapped around the magnetostrictive actuator. When the coil is excited, the magnetostrictive actuator is immediately elongated approximately 200 μm. Therefore, in case of connecting two of the magnetostrictive actuator in series, a total length of the stroke will be 400 μm. In this case, the impact force to be applied to the particulate matter will be approximately 98 MPa (i.e., 1 ton/cm$^2$).

Alternatively, PZT can also be used as the impact force applying means. However, a length of elongation of the PZT is not sufficiently long, e.g., approximately 0.5 μm per 1 mm thickness. Therefore, in this case, some improvement is required to elongate the stroke of the PZT.

EXAMPLE 1

Hereinafter, a first example of the method and apparatus for compressing particulate matter according to the present invention will be explained with reference to the accompanying figures.

Figure 1:
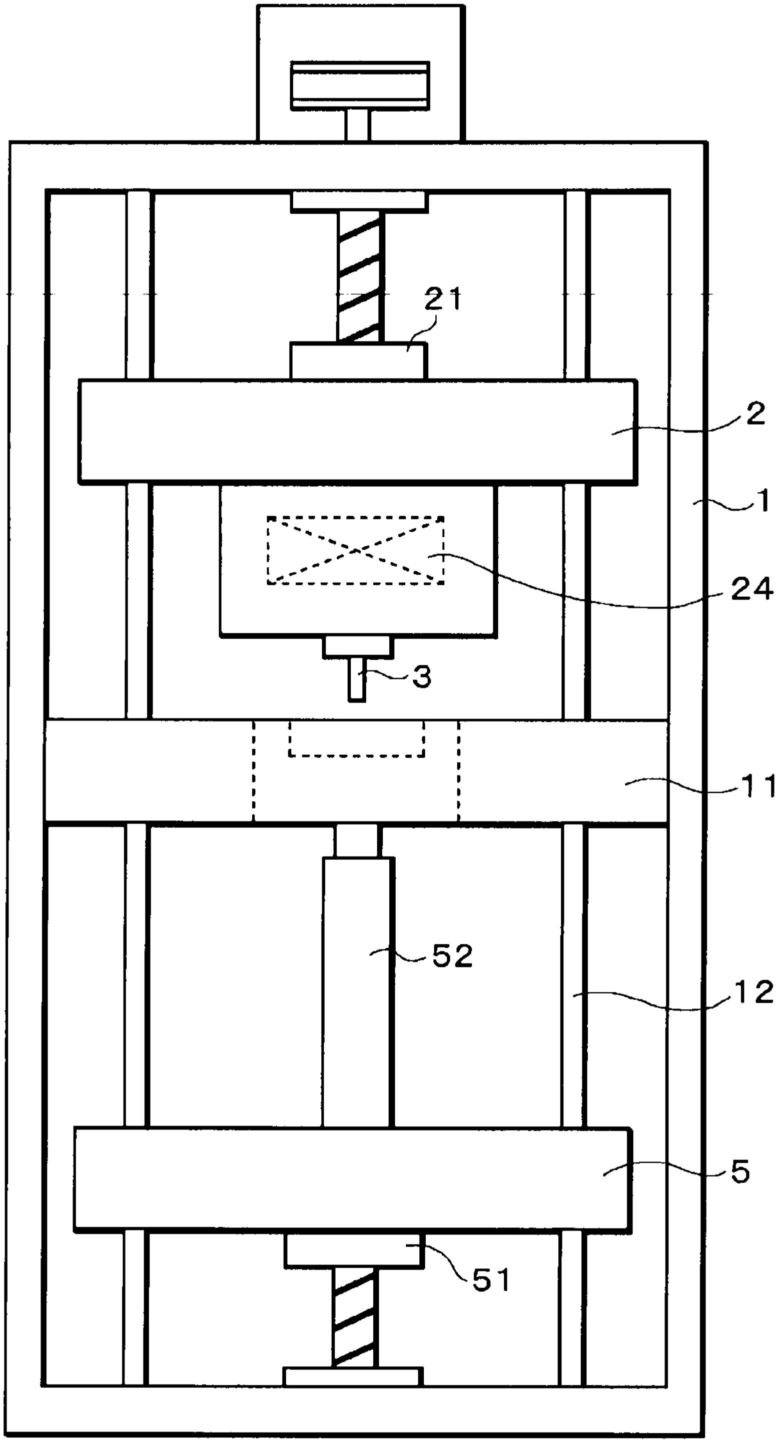
FIG. 1 is a front view showing a compression molding apparatus according to the present invention.
Figure 2:
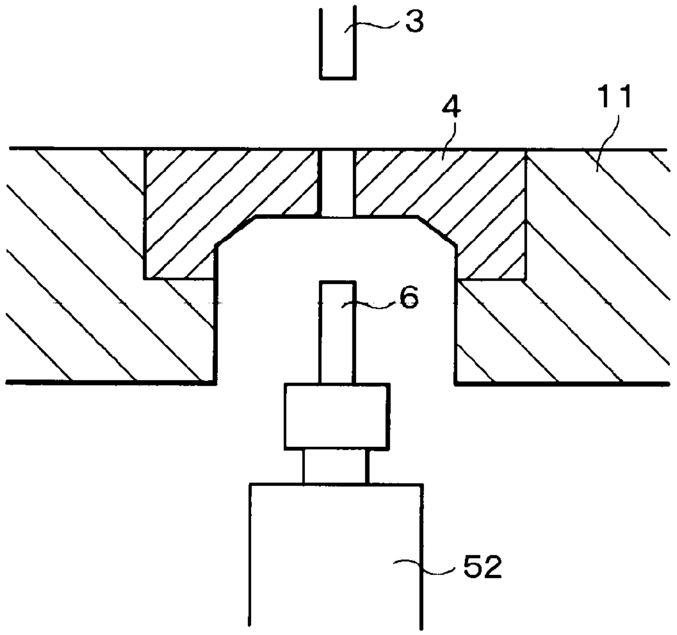
FIG. 2 is a partial sectional view showing a mold and peripheral equipments in an enlarged scale.
Figure 11:
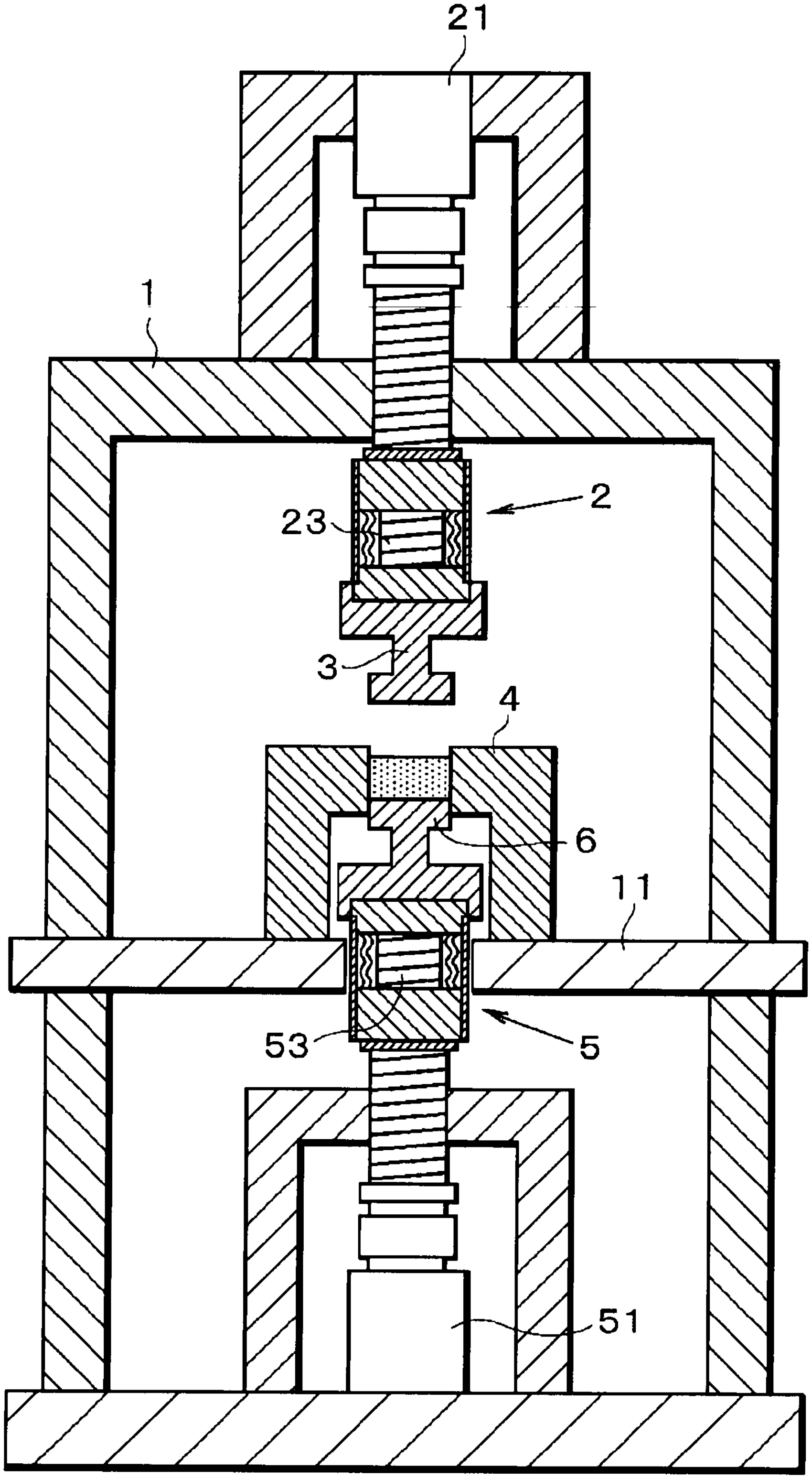
FIG. 11 is a front view showing a conventional impact pressing machine.

FIG. 1 is a front view showing a compression molding apparatus according to the first example, and FIG. 2 is a partial sectional view showing the mold thereof. As can be seen from FIGS. 1 and 2, in addition to the elements shown in FIG. 11 previously explained, the compression molding apparatus of the first example comprises: a guide bar 12 for guiding the upper and lower rams 2 and 5 to move longitudinally; a pressure sensor 24 adapted to measure the pushing force; and an magnetostrictive actuator 52 configured to be elongated when exited. Here, in the example shown in FIG. 1, the pressure sensor 24 is arranged in an upper punch 3 side. However, according to the present invention, the pressure sensor 24 may also be arranged in a lower punch 6 side depending on the pushing force to be measured.

In the compression molding apparatus shown in FIG. 1, the magnetostrictive actuator 52 is interposed between the lower punch 6 and the lower ram 5. However, the magnetostrictive actuator 52 may also be arranged in the upper punch 3 side. Alternatively, the magnetostrictive actuator 52 may be arranged in both of the upper punch 3 side and the lower punch 6 side.

Next, the compression molding method according to the first example will be explained hereinafter.

First of all, the lower punch 6 is moved upwardly by rotating the ball screw 51 using a not shown motor thereby closing a cavity of the die 4 from a bottom side, and the particulate matter is filled in the cavity of the die 4 to a level of an upper surface of the die 4. Then, the particulate matter in the cavity is compressed to a predetermined pressure by a static pressure (that is, the aforementioned preferable precompression is applied), by rotating the ball screw 21 in a manner to lower the upper punch 3 using a not shown another motor. Then, impact force or impulse energy is applied to the particulate matter intervening between the upper punch 3 and the lower punch 6 by exciting the magnetostrictive actuator 52.

Specifically, the impact force is applied to the particulate matter by applying a voltage to the magnetostrictive actuator 52 instantaneously. For example, a pulse voltage of approximately 300 volt and 100 ampere is applied to the magnetostrictive actuator 52 for 200μ second by a not shown power source.

As a result of thus compressing the particulate matter and applying the impact force thereto, a volume of the particulate matter is reduced. The particle matter whose volume is thus reduced is compressed again to a desired pressure by applying a static pressure by moving the upper punch 3 or the lower punch 6, and then the impact force is applied again to the particulate matter by exciting the magnetostrictive actuator 52.

The above-explained cycle is repeated as necessary, e.g., 10 to 20 times.

Then, the work W thus formed is ejected from the cavity by moving the lower punch 6 upwardly. Here, a spring back amount of the ejected work W thus formed is less than half of that of a work compressed only by a static pressure.

In case of using ceramic particles to form the work W, a volume thereof will be reduced approximately by half after compressed entirely and homogeneously. Meanwhile, in case of using particles of tungsten carbide to form the work W, a volume thereof will be reduced approximately by one-third after compressed entirely and homogeneously. As a result, voids of the work W are eliminated, and therefore the work W thus formed will not be shrunk to crack even after sintered at a subsequent sintering step. For this reason, a flawless interim product can be produced.

SECOND EXAMPLE

Next, a second example of the method and apparatus for compressing particulate matter according to the present invention will be explained with reference to the accompanying figures.

In case of applying an impact force to the particulate matter, the punch actuated instantaneously by the impact force applying means excited by the pulse voltage is returned immediately to an initial position. However, a volume of the particulate matter thus compressed instantaneously tends to spring back slightly toward an initial volume. This situation is illustrated schematically in FIG. 8(*a*) in chronological order from left to right.

First of all, the upper punch 3 is lowered to compress the particulate matter to the predetermined pressure by a static pressure. Then, the lower punch 6 is actuated by the impact force applying means to apply an impact force to the particulate matter, and returned to the initial position after approximately 1/10000 second. As a result, a clearance is created between a lower end of the compressed particulate matter and the lower punch 6. A volume of the particulate matter thus compressed returns gradually toward an initial volume thereof by a spring back and the aforementioned clearance is thereby narrowed. However, in this situation, a static friction is acting between the particulate matter and an inner wall of the cavity. Therefore, the spring back of the particulate matter is delayed by such a high resistance resulting from the static friction. In addition, density of the particulate matter becomes inhomogeneous as a result of occurrence of the spring back. Nonetheless, the aforementioned clearance remains between the compressed particulate matter and the lower punch 6 after the termination of the spring back. Then, the lower punch 6 is moved upwardly to the lower end of the work W formed by thus compressing the particulate matter, and this is a final step of a cycle of the compression molding. This cycle is repeated from the first step illustrated in the left end of FIG. 8(*a*) thereby applying the impact force again to the work W.

Figure 8:
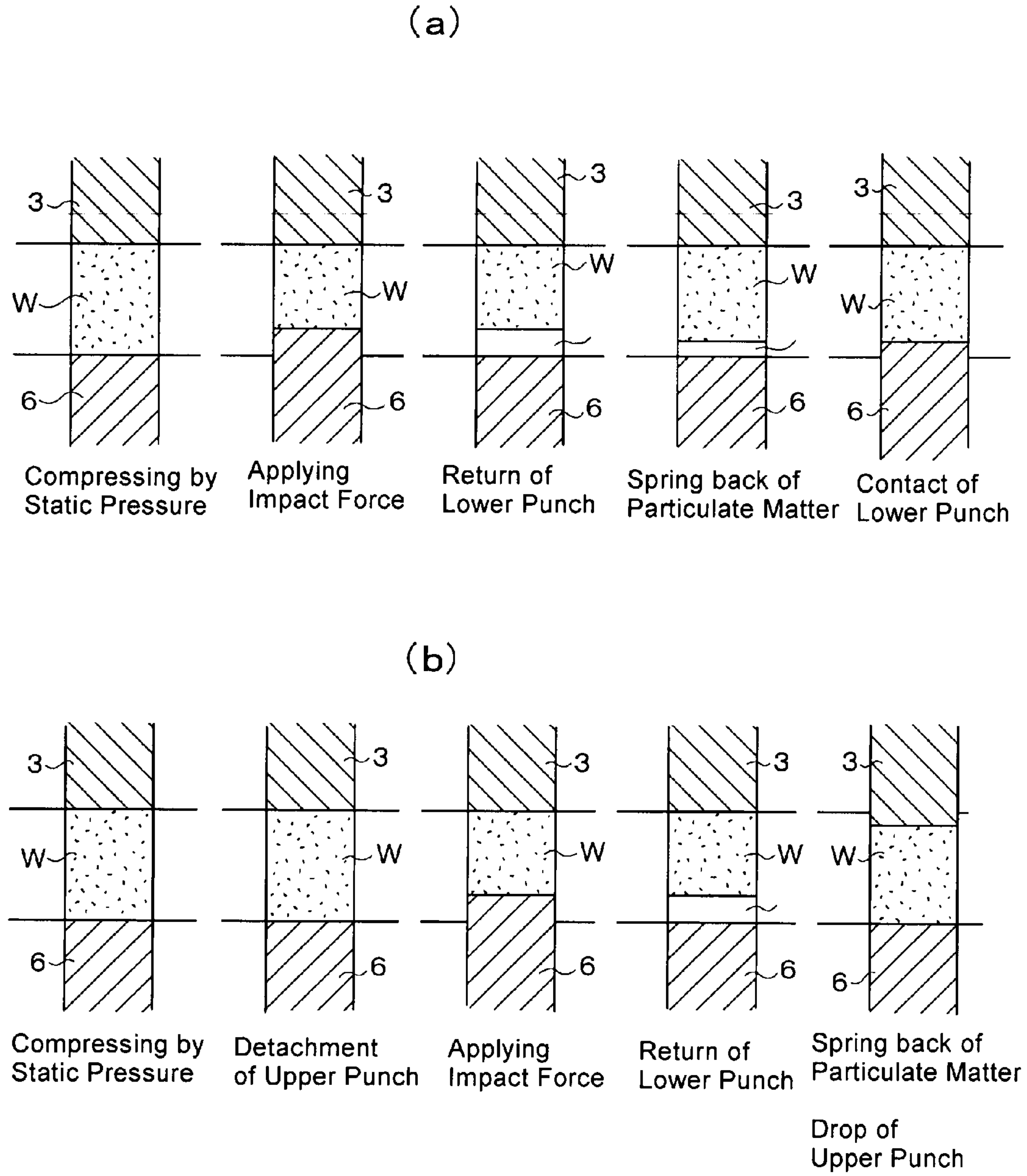
FIG. 8 is a schematic view showing a cycle of the compression molding method of the present invention.

Thus, according to the example shown in FIG. 8(*a*), the lower punch 6 has to be moved upwardly to be contacted with the compressed work W at the end of the cycle thereby eliminating the clearance therebetween. Such step of eliminating the clearance by moving the lower punch 6 upwardly is a time-consuming task, and it has to be repeated in every cycle.

Figure 9:
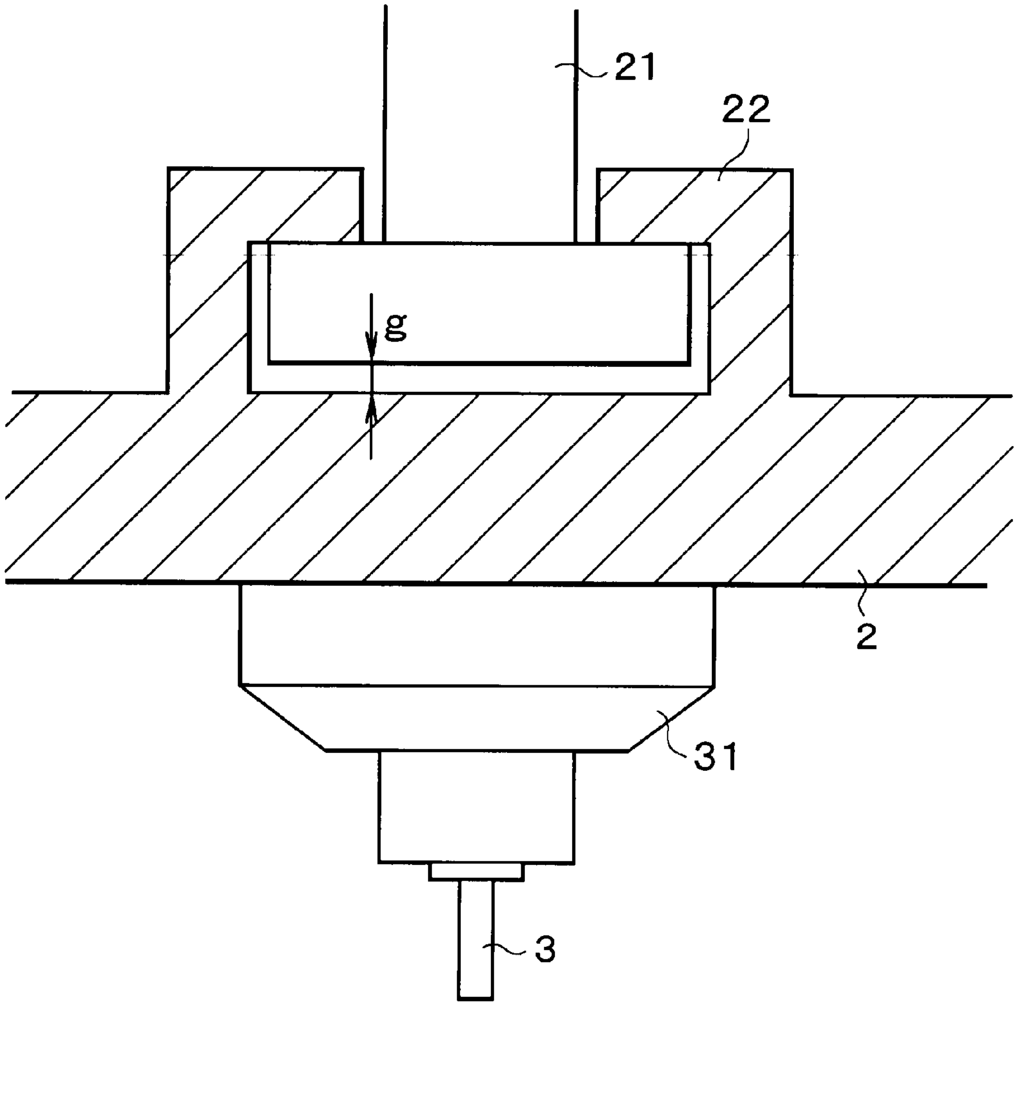
FIG. 9 is a partial sectional view showing a lower end portion of the reciprocating mechanism and the upper ram.

In order to solve the above-explained disadvantage, according to the second example, an upper ram 2 is engaged with a reciprocating mechanism while keeping a clearance therebetween. FIG. 9 is a partial sectional view showing a lower end portion of the reciprocating mechanism and the upper ram 2. Specifically, as shown in FIG. 9, the upper ram 2 is engaged with a (leading end of) ball screw 21 functioning as the reciprocating mechanism by a stopper 22, and a punch holder 31 holding the upper punch 3 is attached to a lower face of the upper ram 2.

According to the engaging structure shown in FIG. 9, the upper ram 2 is engaged with the ball screw 21 at the stopper portion 22 to be pulled upwardly by the ball screw 21. However, a clearance g is maintained between a leading end face of the ball screw 21 and an upper face of the upper ram 2 thereby allowing the upper ram 2 to move vertically.

A function of the engaging structure is illustrated schematically in FIG. 8(*b*). As the previously explained FIG. 8(*a*), steps of compressing the particulate matter are illustrated schematically in FIG. 8(*b*) in chronological order from left to right.

As in the example shown in FIG. 8(*a*), the upper punch 3 is lowered to compress the particulate matter by a static pressure to a predetermined pressure. Then, the ball screw 21 is moved upwardly by being rotated inversely to be detached from the upper ram 2.

Figure 10:
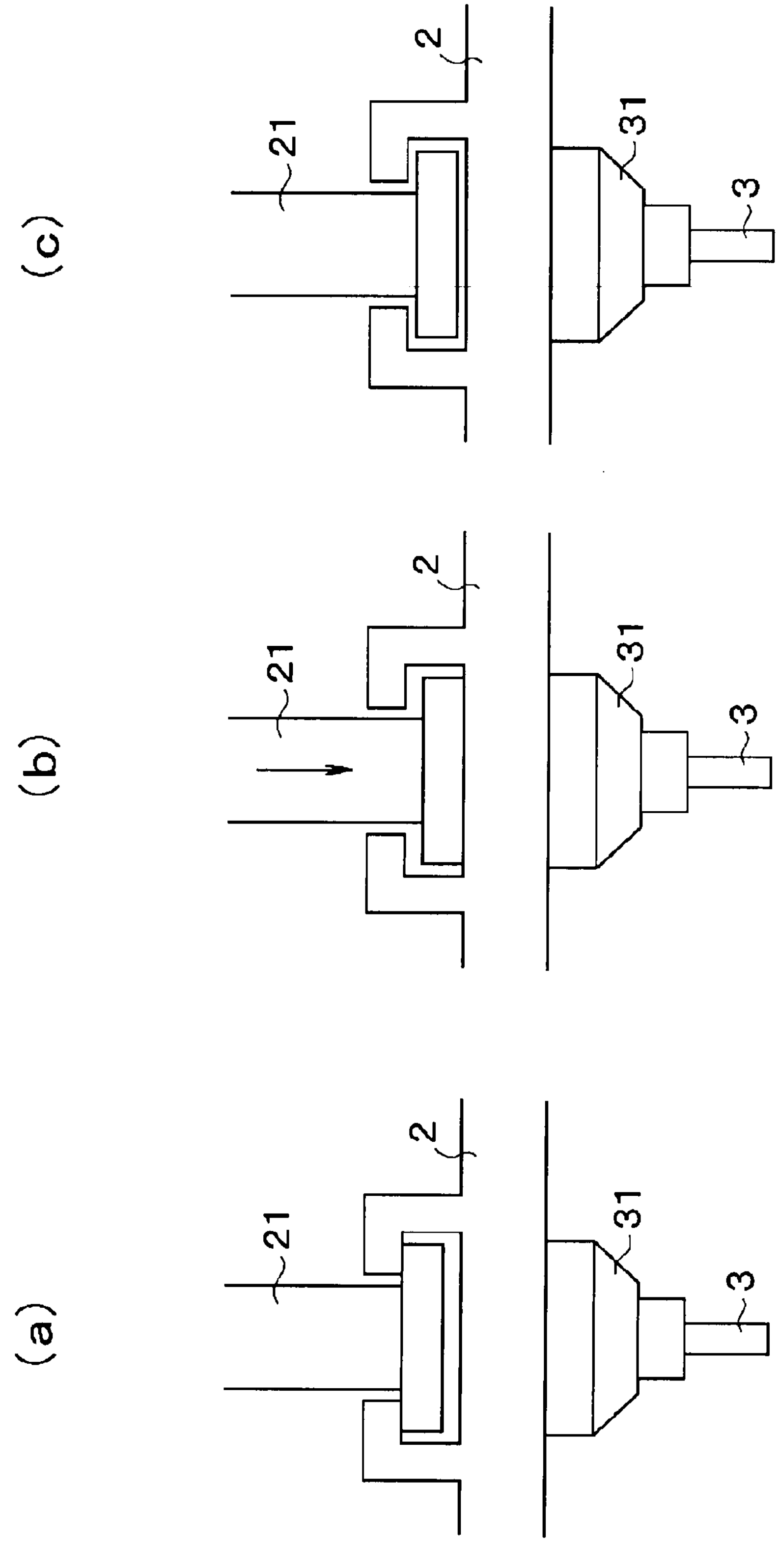
FIG. 10 is an explanatory drawing explaining a clearance between the upper ram and a ball screw.

The above-explained "detached state" will be explained with reference to FIG. 10. Specifically, a standby state of the compressing apparatus before carrying out a compression molding is illustrated in FIG. 10(*a*). In this situation, the upper ram 2 hangs from the leading end of the ball screw 21, and the clearance is created between the leading end of the ball screw 21 and the upper ram 2. Then, the ball screw 21 is moved downwardly to apply a static pressure to the particulate matter as shown in FIG. 10(*b*), and in this situation, the leading end of the ball screw 21 is contacted with the upper ram 2. Then, as shown in FIG. 10(*c*), the ball screw 21 is rotated inversely to be detached from the upper ram 2. In this situation, a pushing force of the ball screw 21 is not applied to the upper ram 2. That is, in the situations shown in FIGS. 10(*b*) and 10(*c*), the upper punch 3 is pushed upwardly by a reaction force of the particulate matter, and a depression of the upper ram 2 is stopped by the particulate matter.

In other words, only a total weight of an assembly of the ram 2 including the punch holder 31 and the upper punch 3 is applied to the particulate matter by moving the ball screw 21 upwardly within a range of the clearance g. That is, the total weight of the assembly of the ram 2 is the above-explained predetermined pressure to be applied to the particulate matter as the precompression force. If the precompression force is smaller than the above explained preferable range, the weight of the ram 2 is increased.

In this situation, an impact force is applied to the particulate matter. In this case, the total weight of the assembly of the ram 2 including the upper punch 3 is sufficiently heavy. Therefore, the work W formed of the particulate matter and the upper punch 3 will not be pushed upwardly by the impact force applied to the work W. For this reason, the impact force can be transmitted entirely in the work W. As in the case shown in FIG. 8(*a*), the lower punch 6 is returned immediately to the initial position and a clearance is therefore created instantaneously between the work W and the lower punch 6. However, in this case, the upper punch 3 falls gravitationally and simultaneously with the spring back of the work W thereby eliminating the clearance between the work W and the lower punch 6. Moreover, a resistance of kinetic friction acting between the work W being lowered by the upper punch 3 and the inner wall of the cavity is rather small. Consequently, a difference between a load on the upper punch 3 and a load on the lower punch 6 is almost eliminated. In addition, since the final step of the method shown in FIG. 8(*a*) for moving the lower punch 6 upwardly to be contacted with the work W is omitted, a cycle time of the method shown in FIG. 8(*b*) can be shortened. Therefore, productivity of the compressing apparatus can be improved.

Thus, the clearance g maintained between the ball screw 21 and the upper ram 2 allows the upper punch 3 to eliminate the clearance created between the particulate matter and the lower punch 6 as a result of applying the impact force to the particulate matter. For this purpose, a preferable amount of the clearance g is approximately 0.2 mm.

The invention claimed is:

1. A compression molding method for particulate matter filled in a cavity of a die by an upper punch arranged above the die, or by a lower punch arranged underneath the die, comprising:

compressing the particulate matter filled in the cavity of the die to a predetermined pressure by moving the upper punch downwardly or moving the lower punch upwardly; and thereafter further compressing the particulate matter by applying an impact force thereto by actuating an impact force applying means arranged between the upper punch and an upper ram to which the upper punch is attached, or arranged between the lower punch and a lower ram to which the lower punch is attached, wherein said compression of the particulate matter to the predetermined pressure by moving the upper punch downwardly or moving the lower punch upwardly is carried out by applying a weight of the upper punch falling gravitationally within a clearance created between a reciprocating mechanism of the upper punch and the upper ram.

2. The compression molding method as claimed in claim 1, further comprising:

eliminating a clearance gap created between the particulate matter further compressed by the impact force applying means and the upper or lower punch, by moving the upper punch downwardly again or by moving the lower punch upwardly again.

3. The compression molding method as claimed in claim 1, wherein:

said compression of the particulate matter to the predetermined pressure by moving the upper punch downwardly or moving the lower punch upwardly, and said further compression of the particulate matter by the impact force applying means, are carried out repeatedly.

4. The compression molding method as claimed in claim 1, wherein:

the impact force applying means includes a magnetostrictive actuator.

5. The compression molding method as claimed in claim 1, wherein:

a stroke of the impact force applying means to further compress the particulate matter is more than twice as an average grain diameter of the particulate matter.

6. An upright compression molding apparatus for particulate matter, which is adapted to compress particulate matter filled in a cavity of a die by moving an upper punch arranged above the die downwardly, or by moving a lower punch arranged underneath the die upwardly, comprising:

a magnetostrictive actuator functioning as an impact force applying means, which is interposed at least between the upper punch and an upper ram to which the upper punch is attached, or between the lower punch and a lower ram to which the lower punch is attached, a reciprocating mechanism, which is adapted to reciprocate the upper punch;

wherein the reciprocating mechanism is engaged with the upper ram while keeping a predetermined clearance thereby allowing the upper punch to fall gravitationally in a vertical direction; and wherein a weight of an assembly including the upper punch and the upper ram is applied to the particulate matter to compress the particulate matter to the predetermined pressure.

7. The compression molding method as claimed in claim 2, wherein:

said compression of the particulate matter to the predetermined pressure by moving the upper punch downwardly or moving the lower punch upwardly is carried out by applying a weight of the upper punch falling gravitationally within a clearance created between a reciprocating mechanism of the upper punch and the upper ram.

8. The compression molding method as claimed in claim 2, wherein:

said compression of the particulate matter to the predetermined pressure by moving the upper punch downwardly or moving the lower punch upwardly, and said further compression of the particulate matter by the impact force applying means, are carried out repeatedly.

9. The compression molding method as claimed in claim 2, wherein:

the impact force applying means includes a magnetostrictive actuator.

10. The compression molding method as claimed in claim 2, wherein:

a stroke of the impact force applying means to further compress the particulate matter is more than twice as an average grain diameter of the particulate matter.

* * * * *